Oct. 2, 1962    W. SCHMIDT ET AL    3,056,877
THAWING DEVICE FOR DEEP-FROZEN SUBSTANCES
Filed Oct. 14, 1959    3 Sheets-Sheet 1

INVENTORS
**WOLFGANG SCHMIDT
FRITZ POTZL**
BY
AGENT

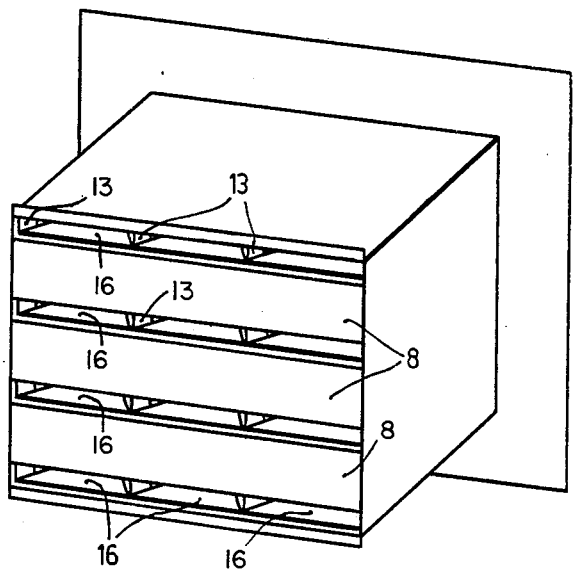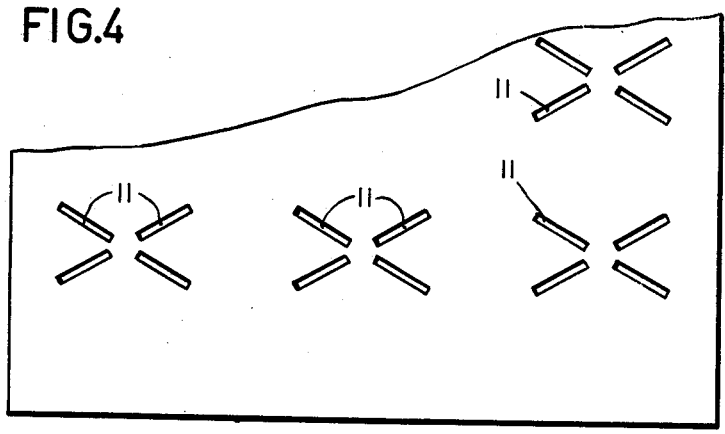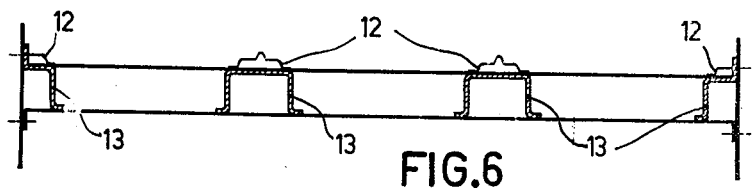

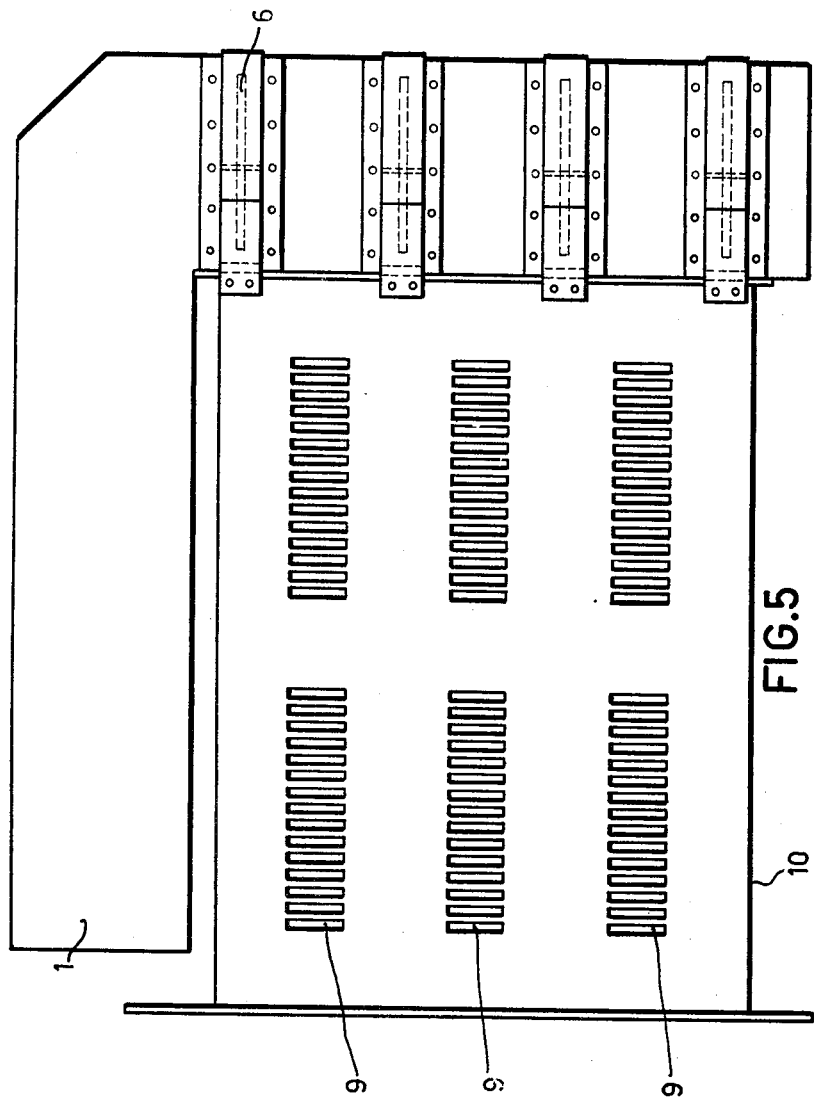

3,056,877
THAWING DEVICE FOR DEEP-FROZEN
SUBSTANCES
Wolfgang Schmidt, Hamburg-Othmarschen, and Fritz Pötzl, Hamburg, Germany, assignors to North American Philips Company, Inc., New York, N.Y., a corporation of Delaware
Filed Oct. 14, 1959, Ser. No. 846,320
Claims priority, application Germany Oct. 16, 1958
5 Claims. (Cl. 219—10.47)

In thawing deep-frozen substances, for example, deep-frozen foodstuffs, the use of hot air only has the disadvantage that the temperature of the air can be chosen only so that the food to be thawed is not burned or is excessively dried. Owing to the poor thermal conductivity of frozen food a comparatively long thawing time is required and it has been found that the taste of the food is thus adversely affected.

For dielectric heating of foodstuffs and industrial products are furthermore known microwave generators with a closed working space. When using only microwave energy to thaw food, difficulties arise in that the dielectric losses in deep-frozen food and those in thawed food are highly different. When deep-frozen foodstuffs are worked by high-frequency energy, the conversion of energy in the foodstuffs is very slight until the first zones have thawed. The energy conversion in water-containing, no longer frozen food is much higher, owing to the considerably greater dielectric losses, so that the thawed peripheral zones absorb a comparatively large part of the high-frequency energy and are more strongly heated than the zones not yet thawed. It is evident that therefore even with the use of high-frequency energy only, the thawing time and the heating time of frozen food cannot be arbitrarily reduced, since the thermal conductivity of the thawing food is to be considered to obtain a uniform heating.

The invention relates to a device for thawing deep-frozen substances, more particularly, deep-frozen foodstuffs, in which both high-frequency energy and thermal energy, produced by hot air, can be employed. The hot air is conductive to the temperature equilibrium between the thawed, water-containing, but still frozen zones.

In this case the hot air serves consequently, a different purpose than in a device known per se for dielectric high-frequency treatment of water-containing substances, in which hot air is blown between the operational electrodes to avoid the precipitation of condensed water and hence the risk of break-down.

With hot-air thawing furnaces it is known to arrange a plurality of foodstuffs on various superimposed levels and to thaw them simultaneously. It is not readily possible to transfer such a device to the known electronic furnaces, since, when a pluralitty of foodstuffs are provided in the working space of the electronic furnace, the food nearest the high-energy connection, which operates as an aerial, would be heated much more strongly than other food.

The invention provides a method in which it is possible to thaw or heat uniformly a great number of deep-frozen substances in a multi-stage furnace by using high-frequency energy and thermal energy provided by hot air.

In accordance with the invention the high-frequency energy is supplied via hollow guides to a plurality of stages of the working space and from there irradiated onto the separate portions of the deep-frozen food through slots provided in the walls of the hollow guides.

Further particulars of the invention will be evident from the following description of the embodiments shown in the drawing.

FIG. 3 shows the device, from which the rear wall is taken off.

FIG. 4 shows, by way of example, the slots in the bottoms of the stages.

FIG. 5 shows the perpendicular slots in the side walls of the working space to allow the hot air to pass.

FIG. 6 shows the rails, on which the thawing substances are positioned.

Figure 1:
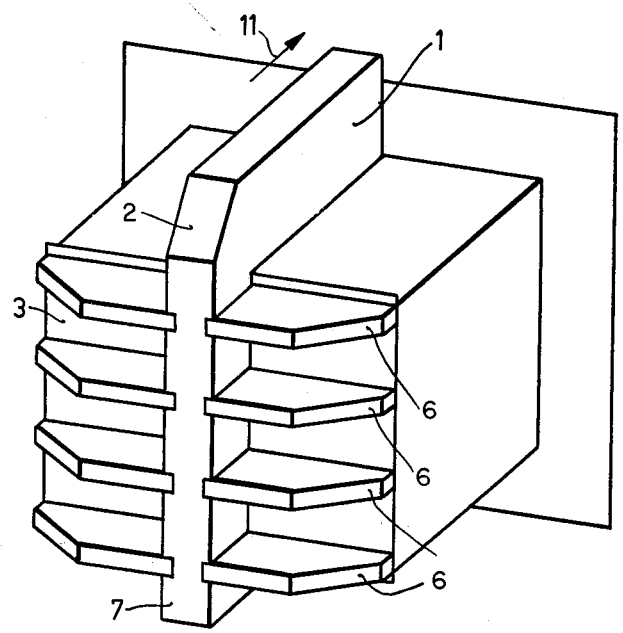
FIG. 1 is an elevation of the device according to the invention, viewed obliquely from the rear.

In the device according to the invention the energy from a high-frequency magnetron, operating, for example, on a wavelength of 12.5 cms., is introduced into a bent-over, rectangular wave guide. That part of the wave guide, which projects to the front in the direction of the arrow 11 beyond the connection, is closed effectively by a short-circuit slide in order to obtain an adequate adjustment of the magnetron to the connected device. The wave energy is first guided in the rectangular wave guide 1 via a known reflection-free bend 2 of the wave guide along the rear wall 3 of the device. By output coupling slots in the rectangular wave guide 1 and by input coupling intermediate pieces 6 the energy is introduced into the bottoms of the stages 16 of the working space. The wave guide 1 is closed at the lower end 7 at a distance of λ/4 from the lower pair of output coupling slots 5. Thereby and by a corresponding choice of the distance of the output coupling slots 5 from each other it can be ensured that at the separate output coupling places maxima of the field are produced.

Figure 2:
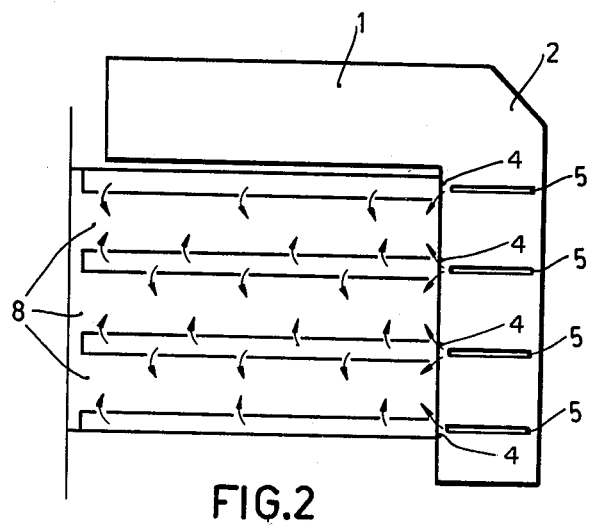
FIG. 2 is a sectional view of the device and the wave guide of the high-frequency energy.

As will be particularly evident from FIG. 3, the bottoms of the stages 16 are constructed in the form of three rectangular wave guides, arranged side by side and short-circuited towards the front of the working space. The walls of these rectangular wave guides are provided with slots, which are arranged so that they produce an advantageous field distribution relative to the separate food items introduced into the working space. The slots in the bottoms of the stages permit of supplying the high-frequency from above and from below at each stage 8 as is indicated by the arrows in FIG. 2.

FIG. 4 shows one example of the slots 11 in a stage bottom. The width of the slots 11 may, for example, be 4 mms.

FIG. 5 shows the perpendicular slots 9 in the side walls 10 of the working space, providing an electric short-circuit. From this figure it is, moreover, evident how the input coupling system can be connected by a screw joint with the device according to the invention. The intermediate bottoms, which are open at the rear, are closed at the front by lead strips. The hindmost openings are opposite the input coupling slots in the rear wall of the working space, to which wall the input coupling intermediate pieces 6 are directly secured by flanges.

In order to avoid that at the irradiating slots 11 (FIG. 4) of the separate stages undesirably high energy concentrations are produced in the substances to be thawed, it is advantageous to position the normal dishes for the food on rails 12, so that a constant distance from the bottoms is maintained. These rails 12 are shown in FIG. 6, which shows a sectional view of a stage bottom. The intermediate bottoms are preferably connected with each other by soldering. The rails 13 divides each stage bottom into three rectangular wave guides of given width. The lowermost bottom is closed on the lower side by an uninterrupted iron plate, which is screwed to the bottom of the working space. In the same manner the lid of the topmost stage may be arranged.

The working space of the device according to the invention is closed on the front side by a door, so that the device is screened off electrically and pneumatically. The electric screen may be obtained for example by means of two λ/4 closures, which are located inside the air seal.

The devices according to the invention provide a uniform energy supply to dissipating intermediate substances by means of a wave guide tapping. The energy is fed by stages and this ensures a uniform heating of a great number of portions, which are introduced into the working space. By the choice of the place and the size of the slots in the stage bottoms it may be readily ensured that the substances to be thawed are irradiated strongly from below, while on top a weaker irradiation takes place. It is thus possible to perform the thawing of the frozen substances simultaneously with the supply of a flow of hot air in a uniform manner. It has bene found that by introducing the high-frequency energy into the distribution system via slots and by the irradiation of the energy via further slots a reduction in the load reaction on the high-frequency generator is obtained.

What is claimed is:

1. A device using hot air and high frequency energy for thawing deep frozen substances comprising a hollow wave guide channel having slots in the walls thereof, a plurality of hollow channels, an enclosure having a plurality of compartments which are separated by said hollow channels, input coupling intermediate members connecting said wave guide channel to each of said separating hollow channels whereby high frequency energy is supplied thereto and towards the compartments through said slots in the walls of said hollow channel to produce a favorable field distribution in said compartments and to irradiate the frozen substances in said separate compartments.

2. A device using hot air and high frequency energy for thawing deep frozen substances as claimed in claim 1 wherein said channels between said compartments are constructed in the form of adjacent, rectangular hollow wave guides.

3. A device using hot air and high frequency energy for thawing deep frozen substances as claimed in claim 1 wherein said channels between said compartments are constructed in the form of adjacent, rectangular hollow wave guides, said compartments being provided in the top and bottom portions with slots for the radiation of high frequency energy.

4. A device using hot air and high frequency energy for thawing deep frozen substances as claimed in claim 1 wherein said channels between said compartments are constructed in the form of adjacent, rectangular hollow wave guides, and a plurality of rails mounted on the bottoms of said compartments for transporting the substances to be thawed.

5. A device for using hot air and high frequency energy for thawing deep frozen substances as claimed in claim 2 wherein the side walls of said enclosure is provided with perpendicular slots for the circulation of hot air, said perpendicular slots being the short circuits for the high frequency energy.

References Cited in the file of this patent

UNITED STATES PATENTS

| | | |
|---|---|---|
| 2,597,825 | Schroeder | May 20, 1952 |
| 2,704,802 | Blass et al. | Mar. 22, 1955 |
| 2,980,909 | Clanton et al. | Apr. 18, 1961 |

FOREIGN PATENTS

| | | |
|---|---|---|
| 995,560 | France | Dec. 4, 1951 |
| 837,092 | Great Britain | June 9, 1960 |

OTHER REFERENCES

Germany application Serial #1,066,678, printed Oct. 8, 1959 (KL21h36).